Feb. 23, 1943. C. T. McGILL 2,311,989
MULTIPORT LIFT-TURN VALVE
Filed July 5, 1940 3 Sheets-Sheet 1
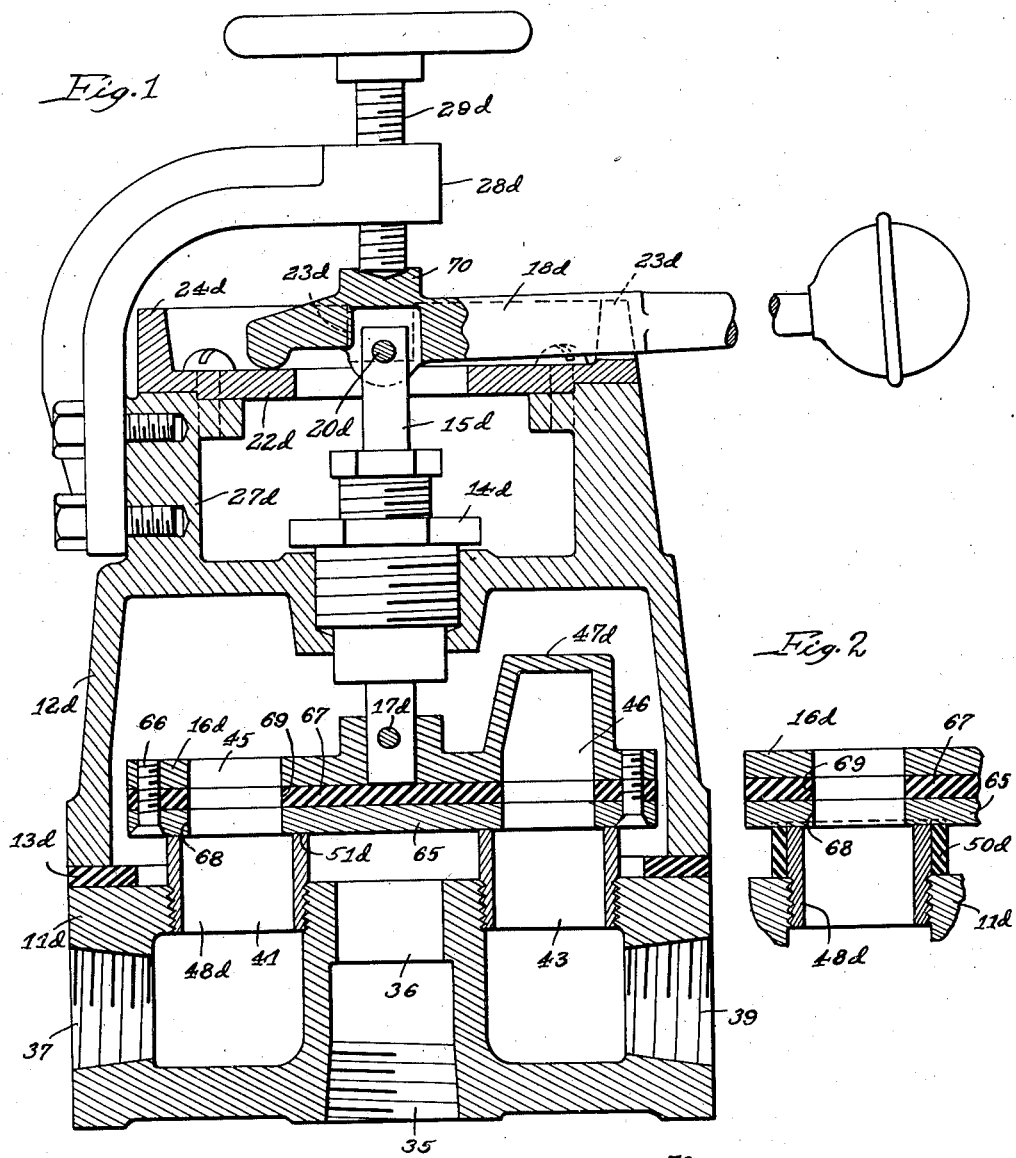
Fig.1
Fig.2
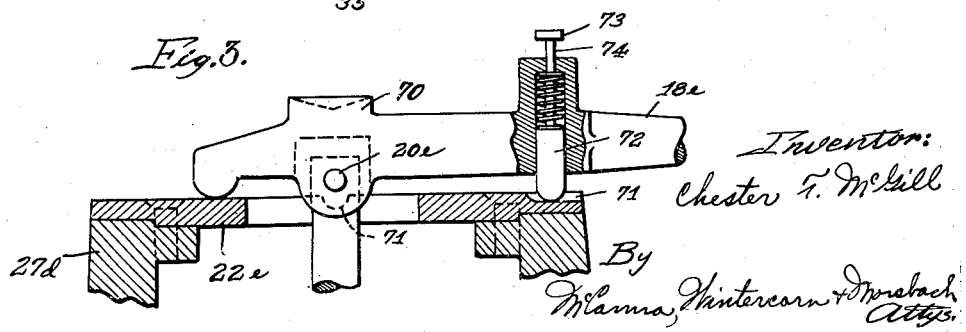
Fig.3
Inventor:
Chester T. McGill
By
Mann, Wintercorn & Morsbach
Attys.

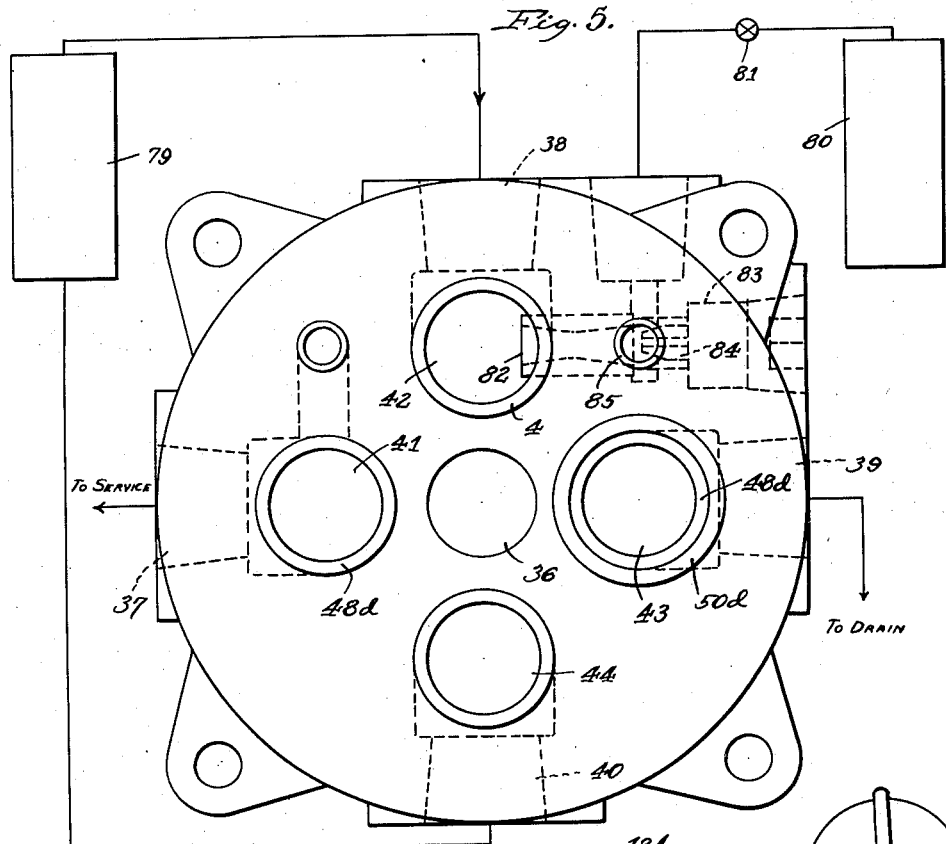
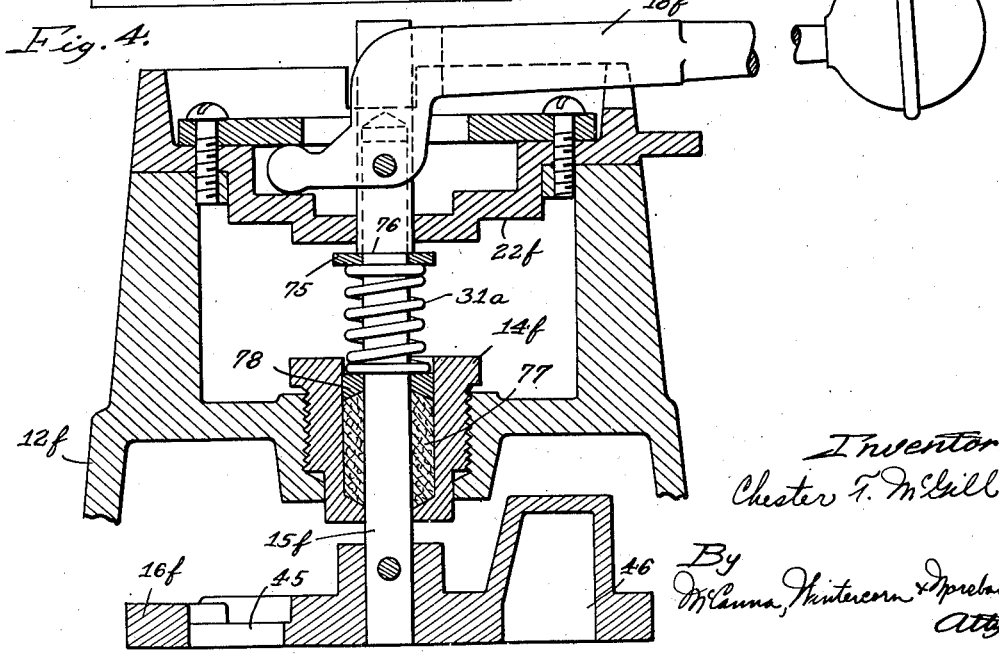

Patented Feb. 23, 1943

2,311,989

UNITED STATES PATENT OFFICE 2,311,989

MULTIPORT LIFT-TURN VALVE

Chester T. McGill, Elgin, Ill.

Application July 5, 1940, Serial No. 344,017

17 Claims. (Cl. 251—84)

This application is a continuation in part of my copending application Serial No. 196,807, filed March 19, 1938, now Patent No. 2,209,992, granted Aug. 6, 1940.

This invention relates to a new and improved multi-port lift-turn valve.

I am aware that rotary plate type valves have been constructed having the plate liftable so as to avoid scoring of its face and the companion face on the stator in turning the same from one position to another, and I am also aware that various provisions have been made in these lift-turn valves to effect a seal in the seating of the plate in its different positions. However, there have invariably been certain objections to these designs which it is the principal aim of my present invention to avoid.

The valve of my invention is designed with the following objectives in mind:

1. To provide for easy lifting and turning by having the rotary plate in spaced relation to the stator when seated, thus obtaining a partly balanced pressure condition.

2. To provide a valve of the lift-turn type in which the water pressure is utilized largely, and in some cases solely, as the means to keep the plate tightly seated.

3. To provide rigid upwardly projecting tubular seat supporting elements on the stator with tubular rubber seals or seats surrounding the same, whereby to combine solid seating of the rotor with good sealing, while incorporating the rubber seals in a way where the water pressure active on the seals tends to increase the tightness of their fit on the supporting elements.

4. To provide the rubber seals in such relation to the tubular supports that the sealing action is more positive, because the yield of the rubber makes up for any slight irregularity in the construction of the valve and possible lack of true parallelism between the stator and rotor, the rubber seals being certain of sufficient yield in the present structure because they are subjected to endwise or longitudinal compression which is moreover beneficial from the standpoint of increased durability.

5. To provide a valve of the kind mentioned in which the construction is so resilient that turning of the rotor without actually lifting the same is made practical, that being desirable from the standpoint of avoiding water hammer action by providing gradual shut-off and turn-on of water as the rotor turns and closes and opens communication between ports.

6. To provide a multi-port valve embodying rubber cushioning and sealing means so that even metal-to-metal seating and turning of the rotor from one position to another without unseating is rendered practical, without danger of scoring.

7. To provide valves of the kind mentioned in which the rubber cushioning medium is provided either in the rotor itself to make allowance for irregularities and insure uniformly good sealing of the rotor on all of the seats or is provided between the rotor and the stator for a similar purpose, the rubber cushioning medium in such cases being provided either under separate seat rings slidably engaging the rotor or under a separate ported abutment plate on which the rotor seats.

8. To provide a lift-turn valve for water softeners or water treatment apparatus generally, having a multiplicity of rigid tubular seats for all of the ports, and a tubular rubber seal surrounding only the seat at the drain port, whereby to permit slight unobjectionable leakage between ports while preventing objectionable loss of water out the drain.

These and other objects of my invention will appear in the following description in which reference is made to the accompanying drawings, wherein—

Fig. 1 is a central vertical section through a multi-port valve embodying my invention;

Fig. 2 is a section through the drain port of Fig. 5;

Figs. 3 and 4 are fragmentary sectional details illustrating modifications;

Figure 6:
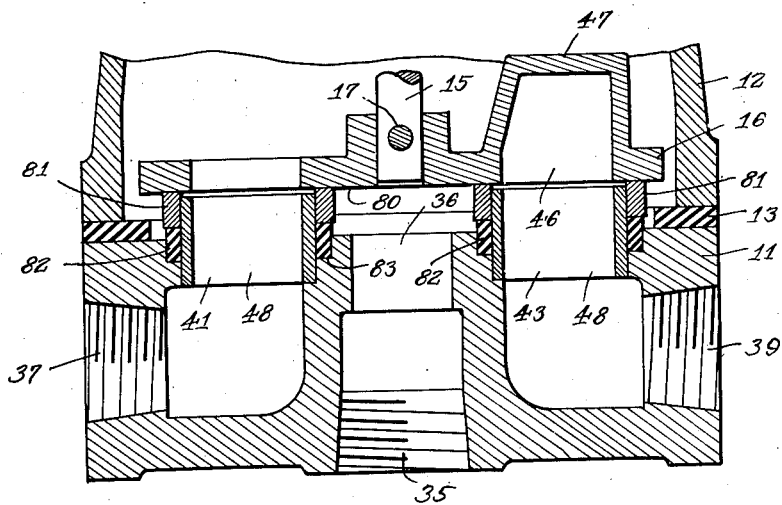
Figure 7:
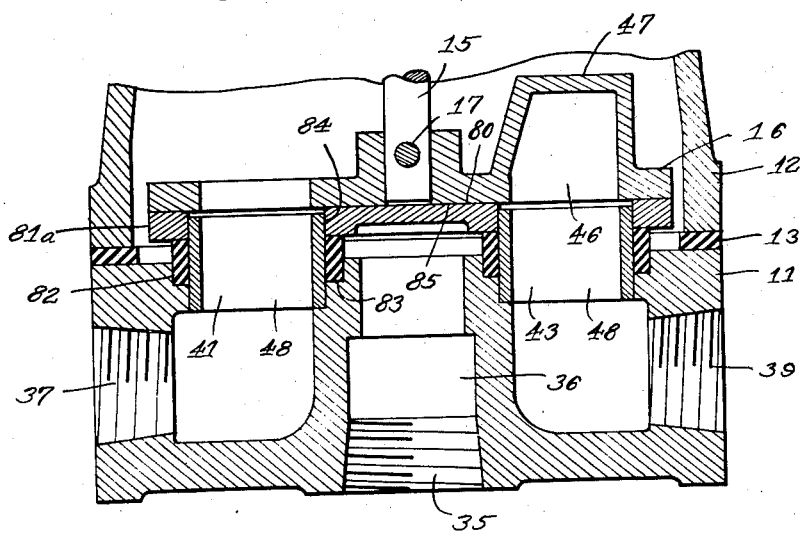

Fig. 5 is a more or less diagrammatic view showing the application of a valve of Fig. 1 to a water softener, the valve having only its stator appearing in plan view, and the same having a tubular rubber seal surrounding only the seat at the drain port in accordance with my invention; and Figs. 6 and 7 are fragmentary sectional views along the lines of Fig. 1 showing two other modified or alternative constructions.

Similar reference numerals are applied to corresponding parts throughout the views.

Referring first to Fig. 1, 11d designates the stator or body member of the valve on which a cap or cover 12d is suitably secured, compressing a gasket 13d therebetween to prevent leakage. A packing gland 14d in the center of the top wall of the cover 12d prevents leakage around the valve stem 15d which is reciprocable and rotatable to lift and turn the rotor or stem plate 16d, suitably secured to the stem, as indicated at 17d.

A hand lever 18d has a bifurcated portion into which the upper end of the stem 15d extends and is pivotally connected to the handle by a crosspin 20d. The rounded end of the lever 18d is slidably fulcrumed on the index plate 22d which has notches 23d in an upstanding annular flange 24d for releasably locking the lever 18d in certain positions and accordingly hold the rotor in adjusted position. A screw 29d threaded in the yoke 28d against the boss 70 on the lever 18d will clamp the rotor 16d down firmly onto the seats, hereinafter described, so as to insure better sealing action. Now, while I have shown a holddown screw, it should be understood this may be dispensed with, as I have found by trial that the hydraulic pressure is sufficient to keep the rotor plate tightly seated. When the screw 29d is backed away from the stem, one may lift the rotor 16d by means of the handle 18d and then turn the rotor and reseat it, with the lever 18d engaged in another notch 23d, after which the screw 29d can be threaded back again to clamp the rotor 16d in adjusted position. While no spring means is shown in conjunction with the stem 15d, I may provide spring means, as at 31a in Fig. 4, tending normally to urge the rotor 16d upwardly, the spring pressure nearly counterbalancing the hydraulic pressure on the rotor tending to seat it so that it requires very little force applied to the outer end of the lever 18d to lift the rotor. Such spring action serves to prevent the rotor from being seated too quickly, and water-hammer action is thereby eliminated as the rotor is seated gradually. The extent to which the rotor may be lifted in unseating is limited by engagement of the center boss on the rotor with the lower end of the gland structure 14d.

While the present invention is applicable to valves generally, the one disclosed is designed for use in controlling the flow of fluids to and from a zeolite water softener, and the stator 11d has a central axial threaded opening 35 for connection with the raw water supply pipe. Hence, the port 36 communicating with this opening may properly be called a pressure port. A plurality of radial threaded openings like those shown at 37 and 39 in Fig. 1 are provided in the stator in circumferentially spaced relation, as indicated in Fig. 5, where four of these openings appear numbered 37 to 40. These openings are for connection to pipes that conduct fluid into and out of the valve, through the central pressure port 36 and circumferentially spaced ports 41—44 in the top of the stator. Now, the rotor 16d has circumferentially spaced ports like those shown at 45 and 46 which come into register with the circumferentially spaced ports in the stator in different operative positions of rotary adjustment in the rotor. In addition, there is a hollow boss 47 on the rotor which serves to provide a connecting passage between the port 46 and another port in the rotor which does not appear in Fig. 1. This boss therefore provides communication between whatever stator ports are placed in communication with the rotor ports interconnected by said boss. It is clear that the rotor 16d will be turned to positions predetermined by the location of the notches 23d, so as to bring rotor ports selectively into registration with stator ports, whereby to control the flow of fluid through the valve in a predetermined manner.

Rigid metallic tubular seats 48d are threaded in the ports of the stator 11d and have flat upper ends 51d all in substantially the same plane.

The rotor 16d carries a face plate 65 fastened around its edges by screws 66 entered through holes in the plate 65 and threaded in the rotor 16d, as shown. A circular rubber gasket 67 is held in place between the rotor and face plate, and there are holes 68 in the face plate and registering holes 69 in the gasket matching the ports in the rotor so as to establish communication through the face plate and gasket between the rotor and stator ports when the rotor is seated with the face plate 65 resting on the flat top surfaces 51d on the tubular seats 48d. With this construction, metal-to-metal seating is rendered practical by reason of the rubber cushion effect of the gasket 67, and there is no danger of scoring as in the ordinary valve constructions having metal-to-metal seating. The rubber gasket furthermore makes allowance for irregularity in construction and insures uniformly good sealing on all of the seats with substantially uniform sealing pressure. When it is realized that in the fastening of the cover 12d the gasket 13d may be subjected to greater compression at one point than at another and cause the rotor to be thrown out of true parallelism with the stator a corresponding amount, the advantage of the present construction can be better appreciated; the gasket 67 being yieldable will compensate for the misalignment and permit tight metal-to-metal seating of the rotor on all of the seats on the stator. A tubular rubber seal 50d is provided, as in Fig. 2, normally projecting slightly beyond the upper end of the drain port seat, as indicated in dotted lines and adapted to be compressed as the rotor is seated, whereby to provide a good water-tight seal around said seat. However, it will be understood, such seals may be provided around a plurality or all of the tubular seats, if desired. The screw 29d threaded in the yoke 28d against the boss 70 on the lever 18d clamps the rotor 16d down firmly onto the seats so as to insure better sealing action. The rubber gasket 67 in this clamping action affords the desired yield while accommodating the face plate 65 to the seats on the stator.

As shown in Fig. 3, I may employ an index ring 22e instead of the ring 22d shown in Fig. 1. This ring 22e is flat on top and merely has radial depressions 71 at the points corresponding to the locations of the notches 23d, and a spring-pressed plunger 72 carried in the lever 18e is adapted to engage under spring pressure into any one of these depressions as the handle 18e is turned to turn the rotor from one position to another. The lower end of the plunger 72 is rounded so as to ride easily into and out of the depressions, but it will require a slight upward pull on the latch to unlock the lever for rotary movement, and for that purpose the small knob 73 is provided on the upper end of the stem 74 of the plunger.

In Fig. 4 I have shown a spring 31a, as previously mentioned, to aid in lifting the rotor. This spring is outside the valve and surrounds a stem 15f between the packing gland 14f and a washer 75 engaging a shoulder 76 on the stem 15f. In that way, the one spring serves the double purpose of counteracting the hydraulic pressure acting on the rotor 16f, while compressing the packing material 77 under the gland ring 78. This location of the spring is furthermore of advantage in eliminating likelihood of its rusting and losing spring pressure.

The diagram in Fig. 5 illustrates the valve of Fig. 1. With this arrangement of a seal at the drain port only the leakage between the other ports, due to the absence of rubber seals, is too slight to be objectionable and the rubber seal at the drain port prevents objectionable loss of water. The tank diagrammatically indicated at 79 is an upflow softener tank and the tank shown at 80 is a brine tank which is placed in communication with the valve when the shut-off valve 81 is opened. A brine ejector nozzle 82 is supplied with water under pressure from the chamber 83 with which the jet 84 communicates, when water is supplied to the chamber 83 through the tube 85, as illustrated in my copending application Serial No. 190,660, filed February 15, 1938.

The valve shown in Fig. 6 is generally similar to that of Fig. 1 and corresponding parts have been numbered accordingly. The principal difference lies in the fact that the rotor 16 does not include the face plate 65 and rubber gasket 67 but has a plain flat bottom face 80 which slidably engages seat rings 81 which have a working fit on the tubular seats 48 entered in the ports of the stator 11. The rings 81 bear upon and are cushioned by rubber rings 82 which surround the tubular seats 48. The stator 11 is preferably bored, as at 83, around each of the tubular seats 48 so as to accommodate rubber rings 82 of greater length than could otherwise be used. The rubber rings 82 fit tightly on the tubular seats and, therefore, serve as seal members in addition to giving the cushioning action mentioned. It will be noticed that although the rotor 16 is seated, it is spaced from the upper end of the tubular seats 48, having compressed the rubber rings 82 somewhat in seating so as to have the desired tight engagement with all of the seat rings 81 and thus avoid danger of leakage. The tubular seats 48 will serve positively to limit the degree of compression of the rubber rings 82 should the rotor 16 be operable by screw-threaded means such as that shown at 29d in Fig. 1, thus eliminating danger of too great compression of the rubber rings beyond what is necessary for a good sealing action. When the rotor is to be turned from one position to another, it is not necessary to actually lift the rotor off the seat rings 81 before turning the same, inasmuch as the cushioning action afforded by the rubber rings 82 obviates the danger of scoring even though there may be metal-to-metal contact between the rings 81 and rotor 16. If desired, the rings 81 may be of softer metal than the rotor 16, or vice versa. On the other hand, the rings 81 may be of fairly hard rubber, fiber, or other non-metallic or composition material. With the seat pressure relieved, the rotor can be turned from one position to another and then the full seating pressure can be restored. This kind of operation has the important advantage of eliminating water hammer noise, the water being gradually shut off and turned on as the rotor turns.

The valve of Fig. 7 is similar to that of Fig. 6 and corresponding parts have been numbered accordingly. In this valve the tubular seats 48 projecting from the stator 11 have rubber rings 82 fitting tightly around the same in counterbores 83 provided therefor in the stator, similarly as in Fig. 6, but in place of the separate seat rings 81 a single ported abutment plate 81a is provided having ports 84 therein to receive the upper ends of the tubular seats 84 so that the plate 81a is free to move up and down on the tubular seats relative to the stator, the rubber rings 82 cushioning the plate and at the same time providing a sealing action similarly as in the other valve of Fig. 6. The flat bottom face 80 of the rotor 16 has contact with the flat top face 85 of the abutment plate as shown and it should be clear that the operation of this valve will be substantially the same as the valve of Fig. 6. The plate 81a may be of softer metal than the rotor 16, or vice versa, or, if desired, the plate 81a may be of fiber or other non-metallic or composition material. Here again, the valve is free from the old objection of water hammer action, the water being gradually shut off and turned on again as the rotor is turned.

It is believed the foregoing description conveys a good understanding of the objects and advantages of my invention. The appended claims have been drawn with a view to covering all legitimate modifications and adaptations.

I claim:

1. In a plate type valve adapted for use with a base exchange water softener comprising a ported body member having a raw water supply port, outlet and return ports adapted for connection to the inlet and outlet of a water softener tank, a brine port, and service and drain ports, a cover for the ported face of said body member, and a ported plate member inside the cover rotatable relative to the body member to establish different fluid circuits through the body member by different registration of the ports in different positions of rotation of the plate member, rigid tubular seats defining the ports of said body member and projecting therefrom to positively space said plate member relative to the body member while establishing communication with the ports of the plate member in different positions of the plate member in sealed operative relation to the body member, and means for sealing only the drain port against water leakage, comprising a tubular seal of resilient compressible material having a close telescoping fit on the tubular seat at said drain port and tending to project from the outer end thereof whereby the same is subject to compression by the plate member in the seating of the latter on the tubular seats.

2. In a plate type valve, comprising a ported body member, and a ported plate member, rigid tubular seats defining the ports of one of said members and projecting therefrom to space said members relative to one another and establish communication with the ports of the other member in different positions of the plate member in sealed operative relation to the body member, a ported face plate on the other member adapted to be engaged by said projecting tubular seats, cushioning and sealing means between the face plate and its supporting member ported in register with the ports of said member and face plate, whereby to establish communication between the ported plate and body members, said cushioning and sealing means permitting the face plate to adjust its position relative to its supporting member to have fluid tight engagement with the seats, while said means also prevents leakage between the face plate and its supporting member, and means for turning the plate member from one position to another.

3. A valve as set forth in claim 2, wherein the last-mentioned means includes a threaded member for adjustably forcibly seating the plate member, the face plate's cushioning and sealing means being compressible in the tightening of said member.

4. A valve as set forth in claim 2, including a tubular seal of resilient compressible material closely surrounding one of said tubular seats and projecting normally from the outer end thereof for compression endwise upon engagement with the face plate.

5. In a plate type valve, comprising a ported body member, and a ported plate member, rigid tubular seats inserted in and projecting from the ports of said body member to space said members relative to one another and establish communication with the ports of the plate member in different positions of the plate member in sealed operative relation to the body member, a ported face plate on the plate member adapted to be engaged by said projecting tubular seats, cushioning and sealing means between the face plate and plate member ported in register with the ports of said member and face plate, whereby to establish communication between the ported plate and body members, said cushioning and sealing means permitting the face plate to adjust its position relative to the plate member to have fluid tight engagement with the seats, while said means also prevents leakage between the face plate and plate member, and means for turning the plate member.

6. In a plate type valve comprising a multi-ported body member and a multi-ported plate member for establishing different flows in a series of different positions of rotation of the plate member, a ported face plate on the plate member for engagement with the body member, rigid tubular members projecting from the ports of the body member in register with the ports of the plate member to conduct fluid therebetween and ultimately space the members in seated relation, cushioning and sealing means between the face plate and plate member ported in register with the ports of said face plate and plate member, whereby to establish communication between the ported plate member and body member, the cushioning and sealing means being of a thickness sufficient to permit the face plate to adjust its position relative to the plate and to have fluid-tight engagement with the body member and also prevent leakage between the face plate and plate member, and means for turning the plate member from one position to another.

7. In a plate type valve comprising a multi-ported body member and a multi-ported plate member for establishing different flows in a series of different positions of rotation of the plate member, a ported face plate on one of said members for engagement with the other member, rigid tubular members projecting from the ports of one of said members in register with the ports of the other member to conduct fluid therebetween and ultimately space the members in seated relation, cushioning and sealing means between the face plate and its supporting member ported in register with the ports of said face plate and supporting member, whereby to establish communication between the ported plate member and body member, the cushioning and sealing means being of a thickness sufficient to permit the face plate to adjust its position relative to its supporting member and to have fluid-tight engagement with the other member and also prevent leakage between the face plate and supporting member, and means for turning the plate member from one position to another.

8. In a plate type valve comprising a ported body member and a ported plate member, tubular seat supporting elements defining the ports of one of said members and projecting therefrom toward the other of said members, separate and independent seat rings in telescoping relation therewith and projecting normally from the outer ends thereof, cushioning means for said seat rings also in telescoping relation with said seat supporting elements and tending to resist inward movement of said seat rings upon seating engagement thereof under pressure with the other of said members, the telescoped parts cooperating to space said members relative to one another and establish sealed communication between their ports and to limit compression of said cushioning means in different positions of the plate member in operative relation to the body member, and means for applying and relieving seating pressure on the plate member and turning the plate member.

9. In a plate type valve comprising a ported body member and a ported plate member, tubular seat supporting elements defining the ports of one of said members, separate and independent seat rings in telescoping relation therewith and projecting normally from the outer ends thereof, rubber sealing rings in telescoping relation with said seat supporting elements serving to cushion the seat rings upon seating engagement thereof under pressure with the other of said members, the telescoped parts cooperating to space said members relative to one another and establish sealed communication between the ports and to limit compression of said rubber sealing rings in different positions of the plate member in operative relation to the body member, and means for applying and relieving seating pressure on the plate member and turning the plate member.

10. In a plate type valve comprising a ported body member and a ported plate member, tubular seat supporting elements defining the ports of one of said members and projecting therefrom toward the other of said members, a ported abutment plate for engagement with the other of said members to serve as a seat element and having the seat supporting elements projecting into the ports thereof with freedom of the abutment plate to move longitudinally relative to said seat supporting element, cushioning means for said abutment plate in telescoping relation with the seat supporting elements resisting inward movement of said abutment plate upon seating engagement thereof under pressure with the other of said members, said abutment plate and cushioning means cooperating to space the ported body member and ported plate member relative to one another and establish sealed communication between their ports in different positions of the plate member in operative relation with the body member, and means for applying and relieving seating pressure on the plate member and turning the plate member.

11. In a plate type valve comprising a ported body member and a ported plate member, tubular seat supporting elements defining the ports of one of said members and projecting therefrom toward the other of said members, a ported abutment plate for engagement with the other of said members to serve as a seat element and having the seat supporting elements projecting into the ports thereof with freedom of the abutment plate to move longitudinally relative to said seat supporting elements, rubber sealing rings in telescoping relation with said seat supporting elements serving to cushion the abutment plate upon seating engagement thereof under pressure with the other of said members, said abutment plate and rubber seal rings cooperating to space the ported body member and ported plate member relative to one another and establish sealed communication between their ports in different positions of the plate member in operative relation to the body member, and means for applying and relieving seating pressure on the plate member and turning the plate member.

12. In a plate type valve comprising a ported body member and a ported plate member, tubular elements defining the ports in the body member and projecting therefrom to establish communication with the ports of the plate member in different positions of the plate member in operative relation to the body member, rubber sealing and cushioning rings surrounding the tubular elements in spaced relation to the outer ends thereof, a ported seat plate having the outer end portions of the tubular elements projecting into the ports thereof, said seat plate having the outer face thereof in a plane spaced beyond the outer ends of the tubular elements and adapted to engage the adjacent face of the plate member to establish sealed communication between the ports of the plate member and the ports of the body member, said seat plate resting upon and adapted to compress the rubber sealing and cushioning rings when the plate member is seated thereon, and means for turning the plate member from one position to another.

13. A valve as set forth in claim 12, wherein the body member is recessed annularly with respect to the tubular elements to accommodate the inner end portions of the rubber sealing and cushioning rings, said rings being elongated and seating in the bottoms of said recesses while the outer end portions of said rings project from the body member.

14. In a plate type valve comprising a ported body member and a ported plate member, rigid tubular elements defining the ports in the body member and projecting therefrom to establish communication with the ports of the plate member in different positions of the plate member in operative relation to the body member, compressible resilient cushioning members surrounding said tubular elements in spaced relation to the outer ends thereof, seat rings having working fits on the outer end portions of said tubular elements and projecting from the outer ends thereof for engagement with the plate member to establish sealed communication between the ports of the plate member and the ports of the body member, said seat rings resting upon and adapted to compress the cushioning members when the plate member is seated on the seat rings, said rigid tubular elements serving to limit compression of the compressible resilient cushioning members, and means for turning the plate member from one position to another.

15. A valve as set forth in claim 14, wherein the body member is recessed annularly with respect to the tubular elements to accommodate the inner end portions of the compressible resilient cushioning members, said members being elongated and seating in the bottoms of said recesses while the outer end portions of said members project from the body member.

16. In a plate type valve comprising a ported body member and a ported plate member, tubular elements defining the ports in the body member and projecting therefrom to establish communication with the ports of the plate member in different positions of the plate member in operative relation to the body member, compressible resilient cushioning members surrounding said tubular elements in spaced relation to the outer ends thereof, a ported seat plate having the outer end portions of the tubular elements projecting into the ports thereof, said seat plate having the outer face thereof in a plane spaced beyond the outer ends of the tubular elements and adapted to engage the adjacent face of the plate member to establish sealed communication between the ports of the plate member and the ports of the body member, said seat plate resting upon and adapted to compress the cushioning members when the plate member is seated thereon, and means for turning the plate member from one position to another.

17. In a plate type valve comprising a multi-ported metallic body member and a multi-ported metallic plate member for establishing different flows in a series of different positions of rotation of the plate member, one of said members comprising ported metallic seating means for co-operation with the other member, cushioning and sealing means between the metallic seating means and said one member ported in register with the ports of said metallic seating means and said one member, whereby to establish communication between the ported plate member and body member, the cushioning and sealing means being of a thickness sufficient to permit the metallic seating means to adjust its position relative to said one member by compression of said cushioning and sealing means and to have fluid-tight engagement with the other member and also prevent leakage between the metallic seating means and said one member, rigid tubular members projecting from the ports of one of said members in register with the ports of the other member to conduct fluid therebetween, the end surfaces of said rigid tubular members being all in substantially a common plane and engageable with the proximate surface of the other member in final seated position, and means for turning the plate member from one position to another.

CHESTER T. McGILL.

CERTIFICATE OF CORRECTION.

Patent No. 2,311,989.  February 23, 1943.

CHESTER T. McGILL.

It is hereby certified that error appears in the printed specification of the above numbered patent requiring correction as follows: Page 4, first column, line 42, claim 6, after the word "plate" insert --member--; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.